(12) United States Patent
Yee et al.

(10) Patent No.: US 10,551,843 B2
(45) Date of Patent: Feb. 4, 2020

(54) SURFACE TYPE DETECTION FOR ROBOTIC CLEANING DEVICE

(71) Applicant: Neato Robotics, Inc., Newark, CA (US)

(72) Inventors: Kingman Yee, San Jose, CA (US); Rachel Lucas, Hayward, CA (US); Sarath Suvarna, Fremont, CA (US)

(73) Assignee: Neato Robotics, Inc., Newark, CA (US)

( * ) Notice: Subject to any disclaimer, the term of this patent is extended or adjusted under 35 U.S.C. 154(b) by 127 days.

(21) Appl. No.: 15/647,012

(22) Filed: Jul. 11, 2017

(65) Prior Publication Data

US 2019/0018420 A1 Jan. 17, 2019

(51) Int. Cl.
| | |
|---|---|
| *A47L 5/00* | (2006.01) |
| *G05D 1/02* | (2006.01) |
| *B25J 11/00* | (2006.01) |
| *A47L 9/28* | (2006.01) |
| *A47L 9/04* | (2006.01) |
| *A47L 5/22* | (2006.01) |

(52) U.S. Cl.
CPC ........... *G05D 1/0219* (2013.01); *A47L 5/22* (2013.01); *A47L 9/0411* (2013.01); *A47L 9/0461* (2013.01); *A47L 9/2826* (2013.01); *A47L 9/2842* (2013.01); *A47L 9/2847* (2013.01); *A47L 9/2852* (2013.01); *B25J 11/0085* (2013.01); *G05D 1/0231* (2013.01); *A47L 2201/04* (2013.01); *A47L 2201/06* (2013.01); *G05D 2201/0203* (2013.01)

(58) Field of Classification Search
USPC ................................................ 700/245–264
See application file for complete search history.

(56) References Cited

U.S. PATENT DOCUMENTS

| | | | |
|---|---|---|---|
| 7,599,758 B2* | 10/2009 | Reindle | A47L 9/2821 15/3 |
| 8,855,914 B1 | 10/2014 | Alexander et al. | |
| 8,903,589 B2 | 12/2014 | Sofman et al. | |
| 8,996,172 B2 | 3/2015 | Shah et al. | |

(Continued)

OTHER PUBLICATIONS

U.S. Appl. No. 10/798,227, filed Mar. 11, 2014, entitled "Robot Vacuum with Floor Type Modes," published as U.S. 2005/0010331A1 on Jan. 13, 2015, Charles E. Taylor, applicant.

(Continued)

*Primary Examiner* — Jonathan L Sample
(74) *Attorney, Agent, or Firm* — Kilpatrick Townsend & Stockton LLP

(57) ABSTRACT

The present disclosure describes techniques for a robotic cleaning device to determine a plan to clean an environment based on types of surfaces in the environment. The plan can include a route to take in the environment and/or one or more configurations to apply to the robotic cleaning device during the route. Determining the plan can include inserting detected surface types into an environmental map of the environment. The environmental map can then be used on future routes such that the robotic cleaning device can know a surface type of a surface before the robotic cleaning device reaches the surface. In some examples, a type of a surface of the environment can be detected by the robotic cleaning device based on optical polarization of light.

16 Claims, 12 Drawing Sheets

(56) References Cited

U.S. PATENT DOCUMENTS

| | | | | |
|---|---|---|---|---|
| 9,725,013 | B2* | 8/2017 | Romanov | B60L 58/21 |
| 10,123,674 | B2* | 11/2018 | Gordon | G05D 1/02 |
| 2003/0229421 | A1* | 12/2003 | Chmura | A47L 5/36 |
| | | | | 700/245 |
| 2004/0244138 | A1* | 12/2004 | Taylor | A47L 9/2805 |
| | | | | 15/319 |
| 2005/0010331 | A1* | 1/2005 | Taylor | G05D 1/0219 |
| | | | | 700/245 |
| 2005/0065662 | A1* | 3/2005 | Reindle | A47L 9/2821 |
| | | | | 701/1 |
| 2005/0166354 | A1* | 8/2005 | Uehigashi | A47L 9/2805 |
| | | | | 15/319 |
| 2005/0171644 | A1* | 8/2005 | Tani | A47L 9/009 |
| | | | | 700/253 |
| 2005/0273967 | A1* | 12/2005 | Taylor | A47L 5/28 |
| | | | | 15/319 |
| 2007/0234492 | A1* | 10/2007 | Svendsen | A47L 5/30 |
| | | | | 15/21.1 |
| 2011/0125324 | A1* | 5/2011 | Baek | G05D 1/0219 |
| | | | | 700/258 |
| 2013/0054022 | A1* | 2/2013 | Jang | A47L 9/2805 |
| | | | | 700/245 |
| 2013/0263889 | A1* | 10/2013 | Yoon | A47L 11/24 |
| | | | | 134/6 |
| 2014/0214205 | A1* | 7/2014 | Kwon | A47L 9/2826 |
| | | | | 700/258 |
| 2015/0223653 | A1* | 8/2015 | Kim | A47L 9/0411 |
| | | | | 15/384 |
| 2015/0327742 | A1* | 11/2015 | Strang | A47L 11/4011 |
| | | | | 15/49.1 |
| 2016/0103451 | A1* | 4/2016 | Vicenti | G05D 1/0242 |
| | | | | 700/259 |
| 2016/0157692 | A1* | 6/2016 | Maoro | A47L 9/0472 |
| | | | | 15/300.1 |
| 2016/0166127 | A1* | 6/2016 | Lewis | A47L 9/02 |
| | | | | 15/49.1 |
| 2016/0235270 | A1* | 8/2016 | Santini | A47L 9/0411 |
| 2016/0271795 | A1* | 9/2016 | Vicenti | B25J 9/163 |
| 2016/0374526 | A1* | 12/2016 | Yang | A47L 11/4011 |
| | | | | 701/23 |
| 2017/0049288 | A1* | 2/2017 | Knutson | A47L 11/4011 |
| 2017/0235312 | A1* | 8/2017 | Yoshino | A47L 11/283 |
| | | | | 700/258 |
| 2017/0325647 | A1* | 11/2017 | Kwak | A47L 9/009 |
| 2018/0070787 | A1* | 3/2018 | Gordon | G05D 1/02 |
| 2018/0071918 | A1* | 3/2018 | Angle | H04L 67/125 |
| 2018/0074508 | A1* | 3/2018 | Kleiner | A47L 9/0488 |
| 2018/0284786 | A1* | 10/2018 | Moshkina-Martinson | A47L 9/2831 |
| 2018/0299899 | A1* | 10/2018 | Suvarna | H04W 24/08 |
| 2019/0018420 | A1* | 1/2019 | Yee | A47L 9/281 |

OTHER PUBLICATIONS

U.S. Appl. No. 14/511,947, filed Oct. 10, 2014, entitled "Mobile Robot Area Cleaning," published as U.S. 2016/0103451A1 on Apr. 14, 2016, iRobot Corporation, applicant.

U.S. Appl. No. 14/622,613, filed Feb. 13, 2015, entitled "Mobile Floor-Cleaning Robot with Floor-Type Detection," published as U.S. 2016-0235270A1 on Aug. 18, 2016, iRobot Corporation, applicant.

* cited by examiner

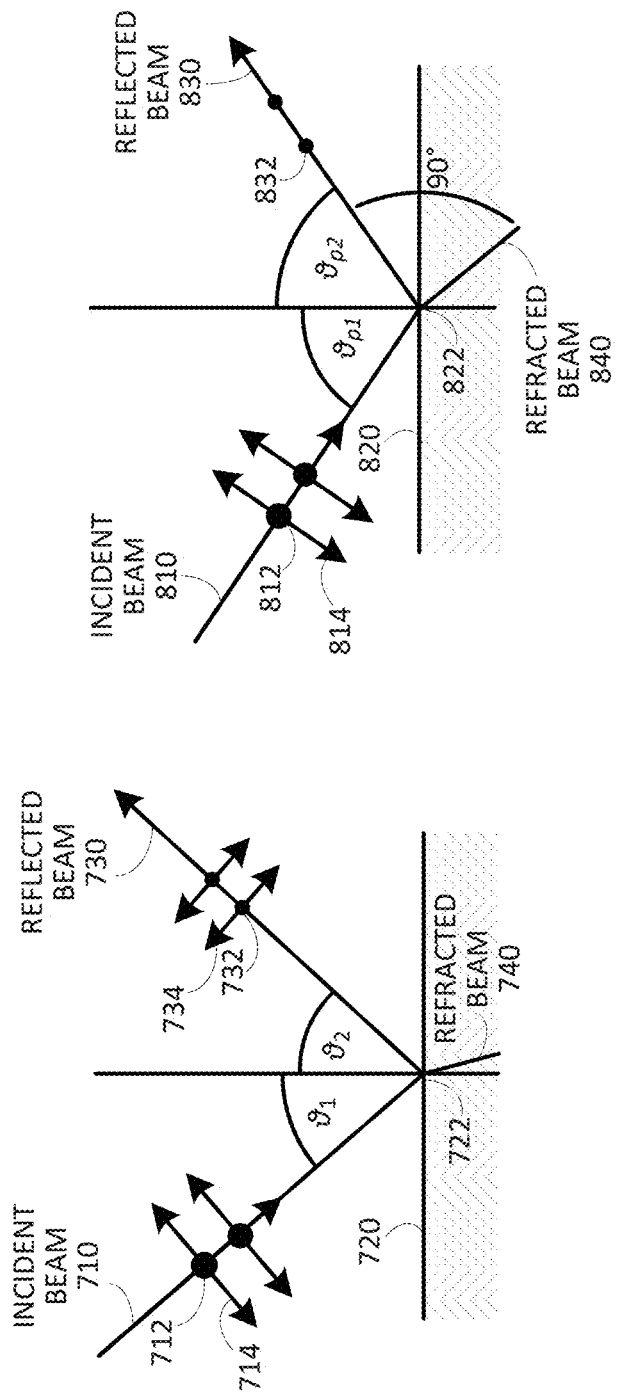

1700

DETECT AN INTENSITY OF A FIRST PORTION OF A LIGHT BEAM AFTER THE FIRST PORTION IS FILTERED BY A FIRST POLAROID FILTER
1710

DETECT AN INTENSITY OF A SECOND PORTION OF THE LIGHT BEAM AFTER THE SECOND PORTION IS FILTERED BY A SECOND POLAROID FILTER
1720

DETERMINE A TYPE OF A SURFACE OF AN ENVIRONMENT BASED ON DATA RECEIVED FROM A FIRST TRIP OF A ROBOTIC CLEANING DEVICE
1730

IDENTIFY A PLAN FOR THE ROBOTIC CLEANING DEVICE TO CLEAN THE ENVIRONMENT
1740

EXECUTE AT LEAST A PORTION OF THE PLAN FOR A SECOND TRIP OF THE ROBOTIC CLEANING DEVICE
1750

FIG. 17

SURFACE TYPE DETECTION FOR ROBOTIC CLEANING DEVICE

BACKGROUND

Robotic cleaning devices have been developed to automatically clean environments with minimal assistance or control from a user. To help with navigation, robotic cleaning devices typically include sensors that allow detection of obstacles in an environment. For example, some robotic cleaning devices include touch sensors that are activated when the robotic cleaning devices bump into an obstacle.

Some cleaning robots use floor-type detection techniques as a trigger for autonomously altering various floor-cleaning characteristics, as described in U.S. patent application Ser. No. 14/622,613. In particular, a flooring type can be determined as a function of a signal from a motion sensor indicative of a change in pitch caused by a cleaning robot crossing a flooring discontinuity. In other examples, the flooring type is determined based on a power draw signal corresponding to a cleaning head assembly of a cleaning robot.

Other cleaning robots determine to alter direction in response to a reflected signal indicating an edge of a floor surface, as described in U.S. patent application Ser. No. 14/511,947. In particular, such cleaning robots include multiple pairs of signal generators and sensors disposed at different locations about a peripheral edge of the cleaning robot, and where a controller is configured to alter the cleaning robot's direction as a function of which sensor receives a reflected signal indicating a floor surface edge.

Other cleaning robots determine a floor type based on output from a surface type sensor, as described in U.S. patent application Ser. No. 10/798,227. The surface type sensors described previously include an optical detector, ultrasound detector, or a mechanical detector. However, these types of detection systems have only been described at a high level, and not with any kind of specificity that would allow a person of ordinary skill in the art to determine the floor type based on the surface type sensor.

SUMMARY

The present disclosure describes techniques to determine and execute a plan for a robotic cleaning device to clean an environment based on types of surfaces (e.g., carpet, wood, tile, stone, or the like) in the environment. The plan can include a route to take in the environment and/or one or more configurations to apply to the robotic cleaning device during the route.

Determining the plan can include inserting detected surface types into an environmental map for the environment. The environmental map can then be used on future routes such that the robotic cleaning device can identify a surface type of a surface before the robotic cleaning device reaches the surface.

Using detected surface types to plan routes can provide many benefits, including prioritizing particular types of surfaces during a route and avoiding areas that cannot be properly cleaned because of available equipment. Other benefits include avoiding areas that should not be cleaned because of perceived frailty of a surface type (such as an expensive rug that may be damaged through extensive traversal) or because of possible hazards (such as avoiding a hearth in front of a lit fireplace, a bathroom rug that may still be damp, a toy rug that a child leaves items on, or a mat underneath a bowl of water left out for a pet). In some embodiments, a user may use surface type detection to restrict the robotic cleaning device from certain areas, such as blocking a doorway with a rug to keep the robot in a particular hardwood section. Additional other benefits include being able to plan a route based on the energy needed to perform the route (e.g., carpets may need more power to traverse through). The robotic cleaning device may also be directed to clean as much area as possible based on a limited battery life.

In some examples, a type of a surface of the environment can be detected by the robotic cleaning device based on optical polarization of light. In particular, a light emitter installed on the robotic cleaning device can produce light to be reflected from the surface at a particular angle (e.g., Brewster's angle of a known surface).

The reflected light can be received by a pair of light detectors, each light detector including a filter for blocking particular light from the light detector. The filters can allow the light detectors to detect polarization of the reflected light. In some examples, a filter can be a polaroid filter configured to block a plane of vibration of an electromagnetic wave. In such examples, a first polaroid filter can be configured to block a first plane and a second polaroid filter can be configured to block a second plane, where the first plane is perpendicular to the second plane. For example, a horizontal filter can prevent light with vertical polarization from reaching a light detector, leaving light with horizontal polarization to be detected by the light detector. Similarly, a vertical filter can prevent light with horizontal polarization from reaching a light detector, leaving light with vertical polarization to be detected by the light detector.

A percentage difference can be calculated using an intensity of light detected by each light detector, the percentage difference indicating a percentage difference between horizontal and vertical polarization. Then, the type of the surface can be determined by comparing the percentage difference with an expected percentage difference for a known surface.

While the description above describes a particular way to determine a type of surface, it should be recognized that other ways (e.g., load monitoring a motor) may be used when determining a plan for a robotic cleaning device to clean an environment.

Determining the surface type can provide many benefits, including: allowing a robotic cleaning device to avoid certain areas, modifying operation of the robotic cleaning device based on a surface type (e.g., carpet is cleaned differently than hardwood), and modifying a route to take based on surface types. For example, the robotic cleaning device may detect (via a sensor) that a user inserted a brush. For a carpet brush, the robotic cleaning device may be configured to only clean when the robotic cleaning device detects carpet. For a hardwood cleaning pad, the robotic cleaning device may be configured to only clean when the robotic cleaning device detects hardwood. In the examples above, the robotic cleaning robot may be mapping an area without cleaning when the robotic cleaning robot has not determined a type for a surface. The robotic cleaning device may also avoid harsh or destructive floor treatments.

As described above, in some embodiments, a robotic cleaning device may be provided. The robotic cleaning device may include a housing, a drive motor mounted in the housing and a drive system, coupled to the drive motor, for moving the robotic cleaning device. The robotic cleaning device may further include a light emitter configured to transmit a light beam at a surface, a first polaroid filter, at least a first light detector configured to detect an intensity of a first reflected portion of the light beam after the first reflected portion is filtered by the first polaroid filter, a second polaroid filter, and the at least a first light detector being configured to detect an intensity of a second reflected portion of the light beam after the second reflected portion is filtered by the second polaroid filter. In some embodiments, the first polaroid filter may have a first polarization axis and the second polaroid filter may have a second polarization axis. In such embodiments, the first polarization axis may be perpendicular to the second polarization axis (e.g., the first polarization axis is parallel to a plane of incidence of the light beam and the second polarization axis is perpendicular to the plane of incidence of the light beam.

In some embodiments, the at least a first light detector may comprise a first light detector positioned to receive light from the first polaroid filter and a second light detector positioned to receive light from the second polaroid filter. In some embodiments, the robotic cleaning device may further include a processor and a non-transitory computer-readable medium including instructions that, when executed by the processor, cause the processor to cause the light emitter to transmit the light beam and obtain each of the intensity of the first reflected portion of the light beam and the intensity of the second reflected portion of the light beam.

In some embodiments, the robotic cleaning device may further include a processor and a non-transitory computer-readable medium including instructions that, when executed by the processor, cause the processor to send the intensity of the first reflected portion of the light beam and the intensity of the second reflected portion to a device remote from the robotic cleaning device. In such embodiments, the device may be configured to determine a type of the surface based on the intensity of the first reflected portion and the intensity of the second reflected portion. In other embodiments, the instructions, when executed by the processor, may further cause the processor to send the type of the surface to a remote server.

In the embodiments described above, the remote server may be configured to determine a plan for the robotic cleaning device to clean an environment and send the plan to the robotic cleaning device. In such embodiments, the plan may be determined based on the type of the surface. When the plan is determined by the remote server, the instructions, included with the robotic cleaning device, when executed by the processor, further cause the processor to receive the plan and execute at least a portion of the plan for a trip of the robotic cleaning device.

In other embodiments, the instructions, when executed by the processor, may cause the processor to determine a type of the surface based on the intensity of the first reflected portion and the intensity of the second reflected portion. In other embodiments, the robotic cleaning device may further include one or more arithmetic logic units to determine a type of the surface based on the intensity of the first reflected portion and the intensity of the second reflected portion. In some embodiments, the instructions, when executed by the processor, further cause the processor to determine a plan for the robotic cleaning device to clean an environment and execute at least a portion of the plan for a trip of the robotic cleaning device. In such embodiments, the plan may be determined based on the type of the surface. In some embodiments, determining the plan is further based on data detected during the second trip or information (e.g., one or more rules associated with particular types of surfaces) received from a remote device.

The plan may include a route for the robotic cleaning device to take through the environment or one or more configurations to apply to the robotic cleaning device when executing the plan.

In some embodiments, the type of the surface is determined based on a first trip of the robotic cleaning device, where the plan is executed on a second trip of the robotic cleaning device. In some embodiments, determining the type of the surface includes: computing a percentage difference for the intensity of the first reflected portion and the intensity of the second reflected portion; comparing the percentage difference to a predefined reflection polarization percentage difference of a known type of surface; and determining that the percentage difference is within a threshold of the predefined reflection polarization percentage difference.

As described above, in some embodiments, a method for executing a plan for a robotic cleaning device to clean an environment may be provided. The method may include determining a type of a surface of the environment, identifying a plan for the robotic cleaning device to clean the environment, and executing, by the robotic cleaning device, at least a portion of the plan for a trip of the robotic cleaning device. The plan may be determined based on the type of the surface. In some embodiments, determining the type of the surface is based on data received from a first trip of the robotic cleaning device, where the trip is a second trip, and where the second trip is after the first trip. The plan may include a route for the robotic cleaning device to take through the environment and/or one or more configurations to apply to the robotic cleaning device when executing the plan.

In some embodiments, the method may further include detecting an intensity of a first portion of a light beam after the first portion is filtered by a first polaroid filter and detecting an intensity of a second portion of the light beam after the second portion is filtered by a second polaroid filter, wherein the data received from the first trip includes the intensity of the first portion and the intensity of the second portion. In such embodiments, determining the type of the surface may include computing a percentage difference for the intensity of the first portion and the intensity of the second portion; comparing the percentage difference to predefined reflection polarization percentage difference of a known types of surface; and determining that the percentage difference is within a threshold of the predefined reflection polarization percentage difference. In some embodiments, the first polaroid filter may have a first polarization axis and the second polaroid filter may have a second polarization axis. In such embodiments, the first polarization axis may be perpendicular to the second polarization axis.

In some embodiments, the method may further include sending the type of the surface to a remote server, wherein the remote server determines the plan and receiving the plan.

As described above, in some embodiments, a computer-program product tangibly embodied in a non-transitory machine-readable storage medium may be provided. The non-transitory machine-readable storage medium may include instructions that, when executed by the one or more processors, cause the one or more processors to: detect an intensity of a first portion of a light beam after the first portion is filtered by a first polaroid filter; detect an intensity of a second portion of the light beam after the second portion is filtered by a second polaroid filter, where the data received from the first trip includes the intensity of the first portion and the intensity of the second portion; compute a percentage difference for the intensity of the first portion and the intensity of the second portion; compare the percentage difference to a predefined reflection polarization percentage difference of a known types of surface; determine a type of a surface of an environment based on determining that the percentage difference is within the threshold; identify a plan for a robotic cleaning device to clean the environment, wherein the plan is determined based on the type of the surface; and execute, by the robotic cleaning device, at least a portion of the plan.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIG. 7 illustrates polarization of reflected light;

FIG. 8 illustrates polarization of reflected light at Brewster's angle;

FIG. 17 is a simplified flowchart depicting processing performed for determining and executing a plan for a robotic cleaning device to clean an environment.

DETAILED DESCRIPTION

Figure 1:
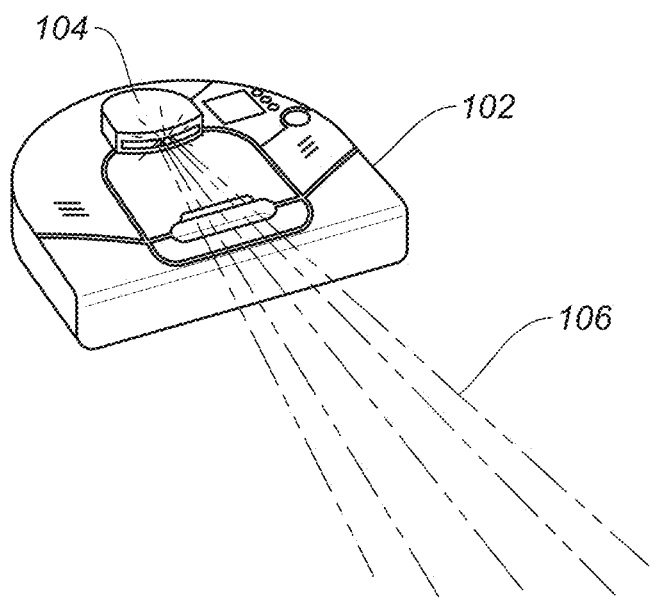
FIG. 1 is a diagram of a robotic cleaning device with a LIDAR turret.

In the following description, for the purposes of explanation, specific details are set forth in order to provide a thorough understanding of examples of the disclosure. However, it will be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may be shown without necessary detail in order to avoid obscuring the examples. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some examples, the systems may be configured as a distributed system where one or more components of the system are distributed across one or more networks such as in a cloud computing system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A. Overall Architecture

FIG. 1 is a diagram of a robotic cleaning device with a LIDAR turret. A robotic cleaning device 102 can include a LIDAR (Light Detection and Ranging) turret 104, which can emit a rotating laser beam 106. Detected reflections of the laser beam off objects can be used to calculate both the distance to objects and the location of the robotic cleaning device 102. One embodiment of the distance calculation is set forth in U.S. Pat. No. 8,996,172, "Distance sensor system and method," the disclosure of which is incorporated herein by reference. The collected data is also used to create a map, using a Simultaneous Location and Mapping (SLAM) algorithm. One embodiment of a SLAM algorithm is described in U.S. Pat. No. 8,903,589, "Method and apparatus for simultaneous localization and mapping of mobile robot environment," the disclosure of which is incorporated herein by reference.

Figure 2:
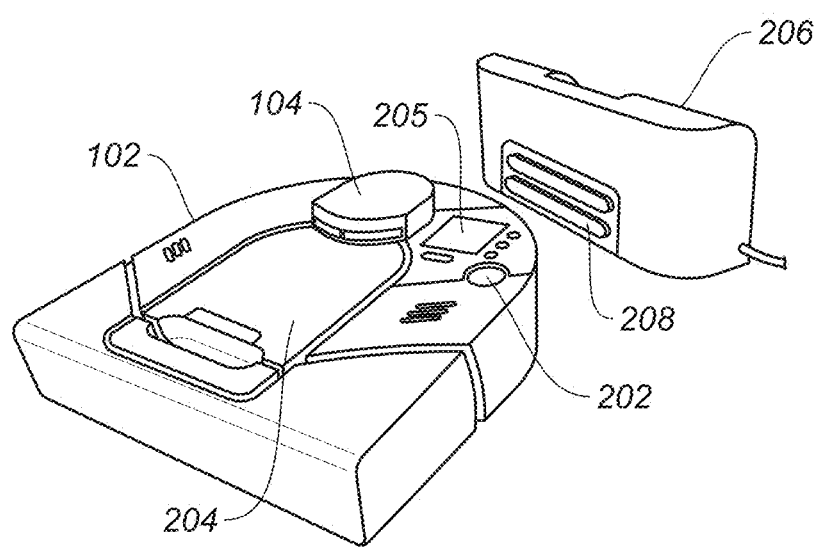
FIG. 2 is a diagram of a robotic cleaning device and charging station.

FIG. 2 is a diagram of a robotic cleaning device and charging station. The robotic cleaning device 102 with the turret 104 of FIG. 1 is shown. Also shown is a cover 204, which can be opened to access a dirt collection bag and the top side of a brush. Buttons 202 can allow basic operations of the robotic cleaning device 102, such as starting a cleaning operation. A display 205 can provide information to the user. The robotic cleaning device 102 can dock with a charging station 206, and receive electricity through charging contacts 208.

Figure 3:
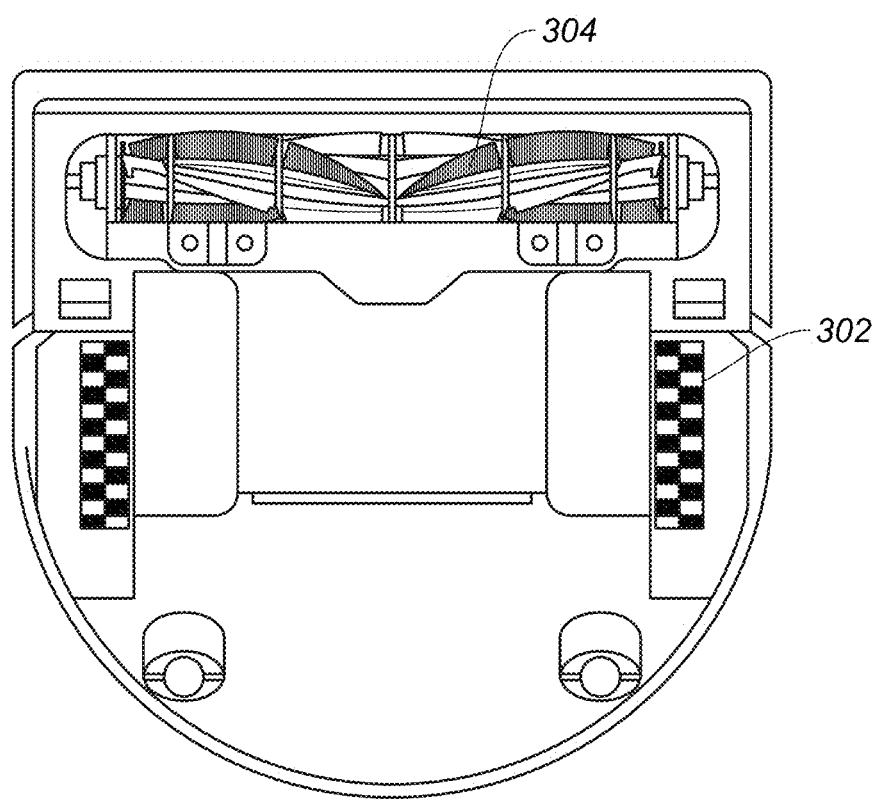
FIG. 3 is a diagram of the underside of a robotic cleaning device.

FIG. 3 is a diagram of the underside of a robotic cleaning device. Wheels 302 can move the robotic cleaning device, and a brush 304 can help free dirt to be vacuumed into the dirt bag.

Figure 4:
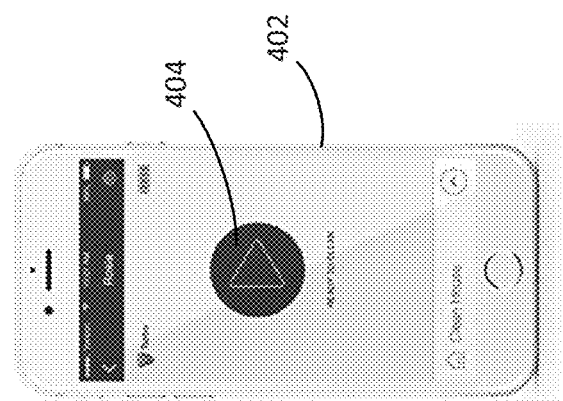
FIG. 4 is a diagram of a smartphone control application display for a robotic cleaning device.

FIG. 4 is a diagram of a smartphone control application display for a robotic cleaning device. A smartphone 402 has an application that is downloaded to control the robotic cleaning device. An easy to use interface has a start button 404 to initiate cleaning.

Figure 5:
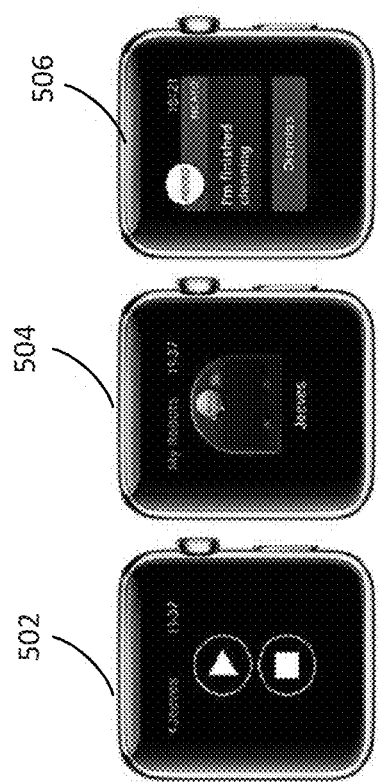
FIG. 5 is a diagram of a smart watch control application display for a robotic cleaning device.

FIG. 5 is a diagram of a smart watch control application display for a robotic cleaning device. Example displays are shown. A display 502 provides and easy to use start button. A display 504 provides the ability to control multiple robotic cleaning devices. A display 506 provides feedback to the user, such as a message that the robotic cleaning device has finished.

Figure 6:
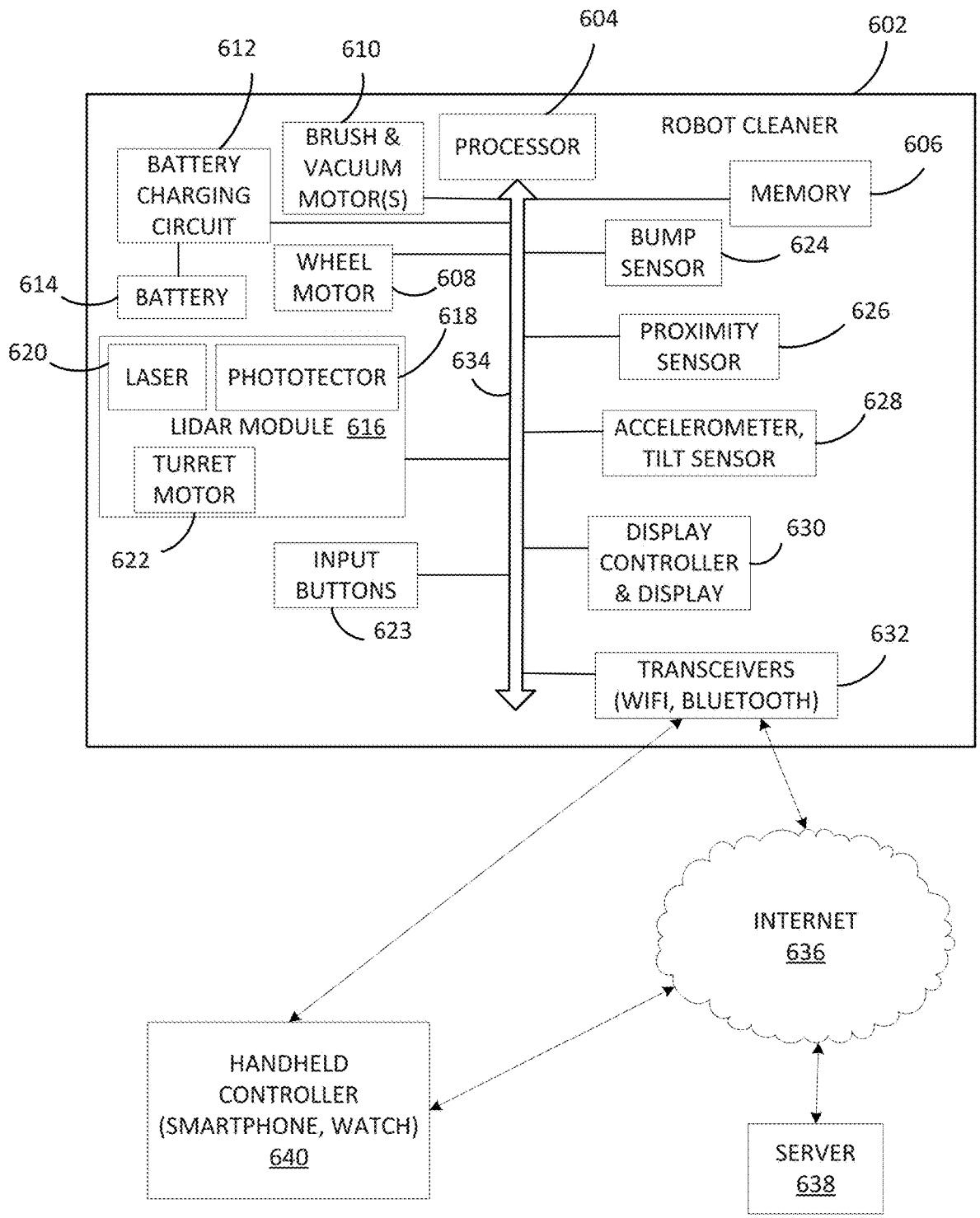
FIG. 6 is a diagram of an electronic system for a robotic cleaning device.

FIG. 6 is a high level diagram of an electronic system for a robotic cleaning device. A robotic cleaning device 602 includes a processor 604 that operates a program downloaded to memory 606. The processor communicates with other components using a bus 634 or other electrical connections. In a cleaning mode, wheel motors 608 control the wheels independently to move and steer the robot. Brush and vacuum motors 610 clean the surface, and can be operated in different modes, such as a higher power intensive cleaning mode or a normal power mode.

LIDAR module 616 includes a laser 620 and a detector 616. A turret motor 622 moves the laser and detector to detect objects up to 360 degrees around the robotic cleaning device. There are multiple rotations per second, such as about 5 rotations per second. Various sensors provide inputs to processor 604, such as a bump sensor 624 indicating contact with an object, proximity sensor 626 indicating closeness to an object, and accelerometer and tilt sensors 628, which indicate a drop-off (e.g., stairs) or a tilting of the robotic cleaning device (e.g., upon climbing over an obstacle). Examples of the usage of such sensors for navigation and other controls of the robotic cleaning device are set forth in U.S. Pat. No. 8,855,914, "Method and apparatus for traversing corners of a floored area with a robotic surface treatment apparatus," the disclosure of which is incorporated herein by reference. Other sensors may be included in other embodiments, such as a dirt sensor for detecting the amount of dirt being vacuumed, a motor current sensor for detecting when the motor is overloaded, such as due to being entangled in something, a surface sensor for detecting the type of surface, and an image sensor (camera) for providing images of the environment and objects.

A battery 614 provides power to the rest of the electronics though power connections (not shown). A battery charging circuit 612 provides charging current to battery 614 when the robotic cleaning device 602 is docked with charging station 206 of FIG. 2. Input buttons 623 allow control of the robotic cleaning device 602 directly, in conjunction with a display 630. Alternately, the robotic cleaning device 602 may be controlled remotely, and send data to remote locations, through transceivers 632.

Through the Internet 636, and/or other network(s), the robotic cleaning device 602 can be controlled, and can send information back to a remote user. A remote server 638 can provide commands, and can process data uploaded from the robotic cleaning device 602. A handheld smartphone or watch 640 can be operated by a user to send commands either directly to the robotic cleaning device 602 (through Bluetooth, direct RF, a WiFi LAN, etc.) or can send commands through a connection to the internet 636. The commands could be sent to server 638 for further processing, then forwarded in modified form to the robotic cleaning device 602 over the internet 636.

B. Light Polarization Properties Due to Reflection Off a Surface

To understand some surface detection techniques described herein, light polarization properties due to reflection off a surface will be briefly described below.

FIG. 7 illustrates polarization of light reflected from a surface 720 (e.g., carpet, wood, tile, stone, or the like). In particular, an incident beam 710 can be aimed at a point 722 of the surface 720. The particular direction to transmit the incident beam 710 can be an angle $\vartheta_1$ measured from a normal of the surface 720. Part of the incident beam 710 can be reflected at the angle $\vartheta_2$ from the normal of the surface 720 (as illustrated by reflected beam 730). Another part of the incident beam 710 can be refracted by the surface 720 (as illustrated by refracted beam 740). In some examples, the surface 720 can include one or more mediums with different refractive indexes. For example, the surface 720 can include a first medium (e.g., hardwood floor) and a second medium (e.g., a laminate) on top of the first medium.

Arrows that are illustrated perpendicular to the incident beam 710 (e.g., arrow 714) indicate intensity of vertical polarization of the incident beam 710. For example, a longer arrow indicates more intensity. Similarly, arrows that are illustrated perpendicular to the reflected beam 730 (e.g., arrow 734) indicate intensity of vertical polarization of the reflected beam 730. Dots that are illustrated on the incident beam 710 (e.g., dot 714) indicate intensity of horizontal polarization of the incident beam 710. For example, a bigger dot indicates more intensity. Similarly, dots that are illustrated on the reflected beam 730 (e.g., dot 732) indicate intensity of horizontal polarization of the reflected beam 730. The dots represent arrows moving toward and away from the viewpoint of FIG. 7.

As can be seen in FIG. 7, the intensity of the vertical polarization of the reflected beam 730 (depicted by the length of the arrow 734) can be less than the intensity of the vertical polarization of the incident beam 710 (depicted by the length of the arrow 714). The reduction of the vertical polarization after reflection off the surface 722 can be because the vertical polarization is partially absorbed by the surface 722 when the incident beam 710 is refracted into the surface 722. Similarly, the intensity of the horizontal polarization of the reflected beam 730 (depicted by the size of the dot 732) can be less than the intensity of the horizontal polarization of the incident beam 710 (depicted by the size of the dot 712). The reduction of the horizontal polarization after reflection off the surface 722 can be because the horizontal polarization is partially absorbed by the surface 722 when the incident beam 710 is refracted into the surface 722. For many surfaces, the reduction of the vertical polarization 734 is typically greater than the horizontal polarization 732.

FIG. 8 illustrates polarization of reflected light at Brewster's angle. Brewster's angle can be an angle of incidence at which light with a particular polarization is perfectly transmitted through the surface 820. When unpolarized light is transmitted at Brewster's angle, the light that is reflected from the surface 820 can be perfectly polarized. In other words, the reflected beam 830 may have a much greater amount of horizontal polarization than vertical polarization (or vice versa depending on the polarization axis used), as can be seen in FIG. 8. In some examples, such as with Brewster's angle, there may be no vertical polarization and some horizontal polarization (non-zero) of a light beam reflected at Brewster's angle.

While the Brewster's angle illustrated in FIG. 8 is less steep than the angle used in FIG. 7, it should be recognized that an angle less steep than Brewster's angle can look similar to that illustrated in FIG. 7, where neither type of polarization is eliminated (or nearly eliminated) in a reflected beam.

Though most (if not all) of the vertical polarization of the incident beam 810 is absorbed or transmitted to the refracted beam 840 at Brewster's angle, a detectable amount of horizontal polarization can be included in the reflected beam 830. To illustrate the differences in vertical and horizontal polarization at different angles, FIGS. 9-12 depict graphs showing reflectance of light polarized parallel and perpendicular to the plane of incidence from various materials with various refractive indexes as a function of an angle of incidence. $R_p$ is the reflectance of light polarized parallel to the plane of incidence (referred to as vertical polarization above), $R_s$ is the reflectance of light polarized perpendicular to the plane of incidence (referred to as horizontal polarization above), $\theta_B$ is Brewster's angle of the surface being depicted (i.e., an angle at which $R_p$ is at a minimum), and M is the magnitude of $R_s$ at $\theta_B$. As can be seen in the graphs, the difference between the horizontal and vertical polarization depends on the difference in index of refraction and the angle of incidence. When light is reflected from a surface with little to no reflective characteristics, the reflected light may not be present or may not be polarized, allowing detection of a type of the surface.

Figure 9:
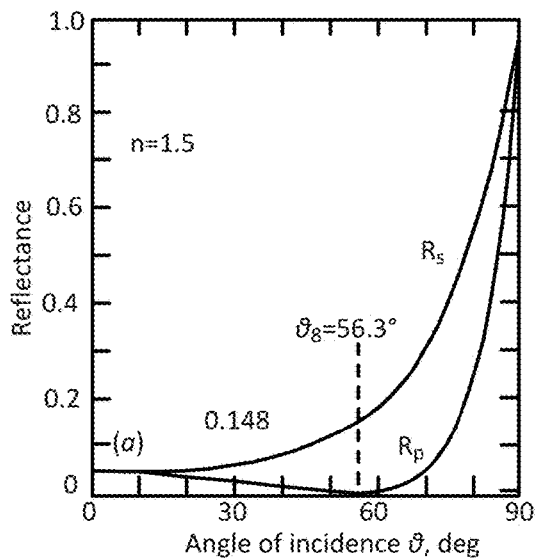
FIGS. 9-12 illustrate examples of graphs showing reflectance of light polarized parallel and perpendicular to the plane of incidence from various materials with various refractive indexes as a function of angle of incidence.

FIG. 9 illustrates an example of a graph 900 showing reflectance of light polarized parallel and perpendicular to a plane of incidence from a material with a refractive index of 1.5, such as alkali halides in ultraviolet and sheet plastics in infrared. As can be seen in the graph 900, the vertical polarization at 56.3 degrees is approximately zero while the horizontal polarization is 0.148.

Figure 10:
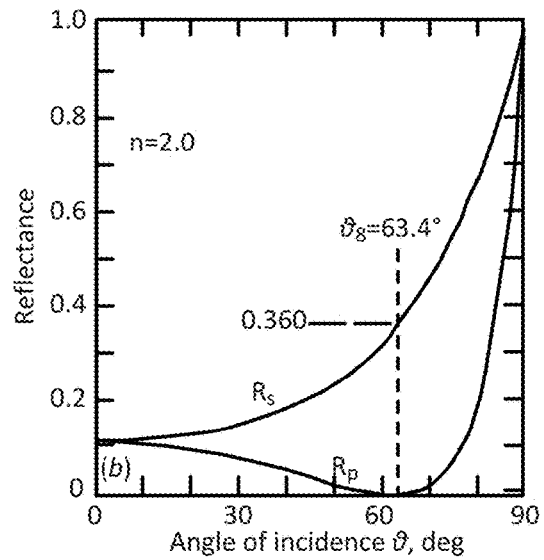

FIG. 10 illustrates an example of a graph 1000 showing reflectance of light polarized parallel and perpendicular to a plane of incidence from a material with a refractive index of 2.0, such as AgCl in infrared. As can be seen in the graph 1000, the vertical polarization at 63.4 degrees is approximately zero while the horizontal polarization is 0.360.

Figure 11:
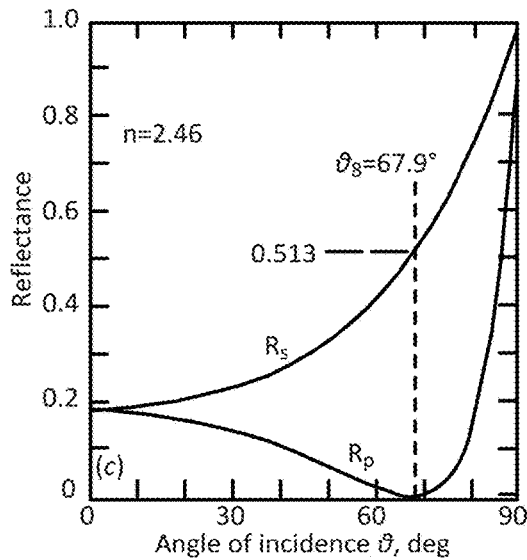

FIG. 11 illustrates an example of a graph 1100 showing reflectance of light polarized parallel and perpendicular to a plane of incidence from a material with a refractive index of 2.46, such as Se in infrared. As can be seen in the graph 1100, the vertical polarization at 67.9 degrees is approximately zero while the horizontal polarization is 0.513.

Figure 12:
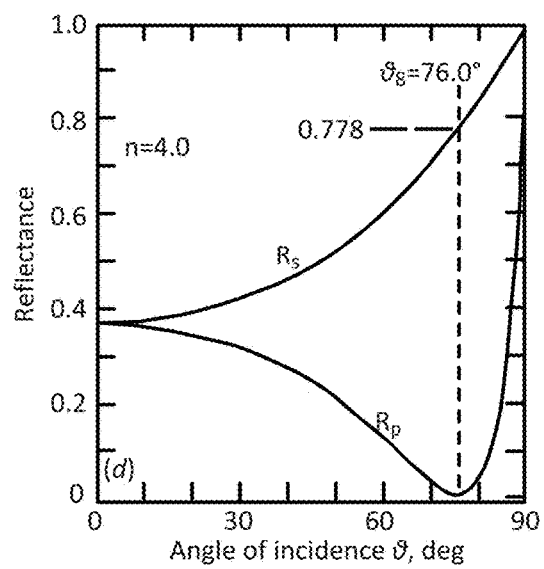

FIG. 12 illustrates an example of a graph 1200 showing reflectance of light polarized parallel and perpendicular to the plane of incidence from a material with a refractive index of 4.0, such as Ge in infrared. As can be seen in the graph 1200, the vertical polarization at 76 degrees is approximately zero while the horizontal polarization is 0.778.

C. Surface Type Detection

A type of a surface can be detected based on a polarization detected in light reflected from the surface. In particular, a light emitter can produce various wavelengths of electromagnetic radiation, such as visible light, infrared light, or ultraviolet light. The electromagnetic radiation can be reflected and/or refracted from the surface. A light detector can be located in a position configured to receive the reflected electromagnetic radiation. Based on what the light detector detects, a type of the surface can be determined. While the discussion below focuses on visible light being reflected from the surface, it should be recognized that other types of waves can be reflected from the surface, such as infrared light and ultraviolet light.

Figure 13:
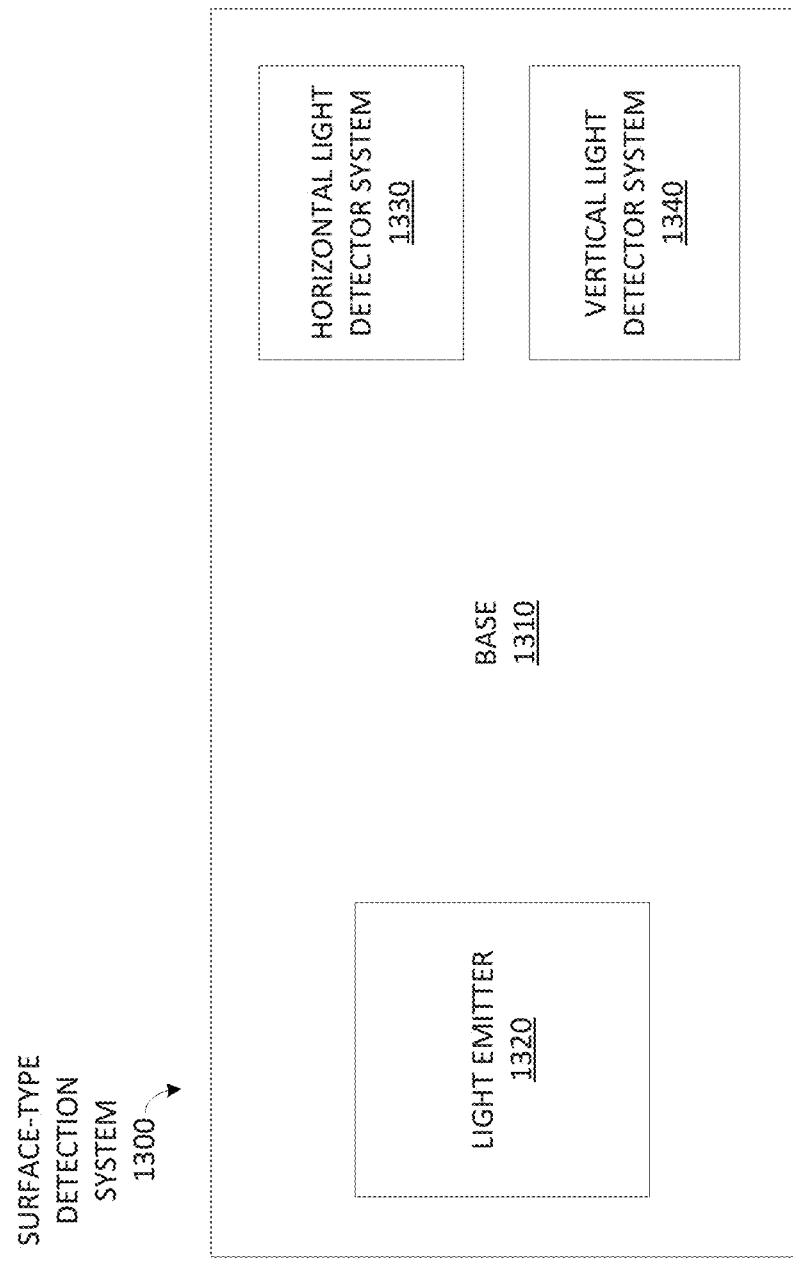
FIG. 13 illustrates an example of a surface detection system.

FIG. 13 illustrates a surface type detection system 1300. While not illustrated, the surface type detection system 1300 can be located at a number of locations on a robotic cleaning device. For example, the surface type detection system 1300 can be located at a front portion of the robotic cleaning device, such that a type of a surface is detected before the robotic cleaning device cleans the surface. For another example, the surface type detection system 1300 can be located behind a cleaning component of the robotic cleaning device, such that a type of a surface is detected after the robotic cleaning device cleans the surface. In such an example, the type of the surface can be detected after the robotic cleaning device cleans the surface because the type is used to plan a future route, and not a current route.

For another example, the surface type detection system 1300 can be located at the rear of the robotic cleaning device. By being located at the rear, the surface type detection system 1300 can prevent the robotic cleaning device from backing onto a particular surface. The surface type detection system 1300, when located at the rear, can also operate as a drop sensor to determine whether the robotic cleaning device is approaching a drop off. For another example, the surface type detection system can be located at or immediately before a wheel to determine how much power to use for the wheel in order to get the wheel (and/or the robotic cleaning device) over a particular surface (e.g., a wheel can be powered up more when high pile carpet is detected, or the robotic cleaning device can implement an anti-skid mechanism for running on slick hard flooring).

The surface type detection system 1300 can include a light emitter 1320 (e.g., a light-emitting diode (LED)). The light emitter 1320 can transmit light (e.g., visible light, infrared light, or ultraviolet light) toward a surface (e.g., a surface) at an angle. The light emitter 1320 can transmit the light continuously, in pulses, or some combination thereof. The pulses can be timed with when the surface type detection system 1300 is detecting light. In some examples, the light emitter 1320 can transmit the light continuously for one or more times. After the one or more times, the light can be transmitted at a lesser rate for future routes. The light emitter 1320 might not transmit light during some routes or during a portion of a route after an environment has been learned.

In some examples, the light emitter 1320 can transmit light (continuously and/or in pulses) until a user confirms that the environment has been learned. In other examples, a confidence level can determine when the environment is determined to be learned. For example, once a number of readings for a particular spot has repeatedly determined the same type of surface, the particular spot can be considered learned by the robotic cleaning robot. It should be recognized that other methods of determining a confidence level can be used.

In some examples, a lens or some other device for redirecting light can be used to transmit the light toward the surface at the angle. In such examples, the light emitter 1320 does not need to point at an angle. For example, the light emitter 1320 can be pointed at a first angle and a lens can direct a light beam from the light emitter 1320 at a second angle. In other examples, the light emitter 1320 can be pointed such that the light is transmitted at the angle toward the surface.

The angle at which the light is transmitted toward the surface by the light emitter 1320 can be configured to maximize a difference between a first polarization (e.g., a horizontal polarization) and a second polarization (e.g., a vertical polarization) in light reflected by one or more known surfaces (which may be different than the surface). In one illustrative example, the light emitter 1320 may have a narrow focus (e.g., less than 20 degrees) and/or produce a light beam with a center wavelength of 639 nm+−15 nm (red equivalent). However, it should be recognized that other configurations of the light emitter 1320 can be used. In some examples, visible, infrared radiation, or long ultraviolet wavelengths may be used. For example, the light emitter 1320 may produce 532 nm (green), 840 nm (near IR), or 1064 nm (IR). In some examples, multiple light emitters can be included in the surface type detection system 1300, each light emitter configured at a different angle and/or direction.

The surface type detection system 1300 can further include one or more light detector systems. The one or more light detector systems can be configured to receive reflected light that was originally transmitted by the light emitter 1320. In some examples, a light detector system can include a light detector (e.g., a photodiode). The photodiode can have an operational wavelength that overlaps a wavelength of the light emitter 1320 or that is between 400-700 nm.

In embodiments with two light detector systems (e.g., a horizontal light detector system 1330 and a vertical light detector system 1340), each light detector system can include a different polaroid filter, allowing each light detector to detect light with a particular polarization. For example, the horizontal light detector system 1330 can include a first polaroid filter (sometimes referred to as a horizontal polaroid filter) that prevents light with a vertical polarization from reaching the detector of the horizontal light detector system 1330. Similarly, the vertical light detector 1340 can include a second polaroid filter (sometimes referred to as a vertical polaroid filter) that prevents light with a horizontal polarization from reaching the detector of the vertical light detector 1340.

In some examples, the polaroid filters of the horizontal light detector system 1330 and the vertical light detector system 1340 can be the same component configured in a different direction. For example, the horizontal polaroid filter can be configured such that a polarization axis of the horizontal polaroid filter is parallel with a plane of incidence of a light beam from the light emitter 1320. In such an example, the vertical polaroid filter can be configured such that a polarization axis of the vertical polaroid filter is perpendicular with the plane of incidence of the light beam from the light emitter 1320. The polaroid filters can each be a linear polarizer (e.g., dichoric film type). In one illustrative example, a polaroid filter can have a thickness less than 0.5 mm, an extinction ratio greater than 1000:1, and be within +−10 degrees of each being offset 90 degrees from each other (preferably only+−1 degree though).

In other examples, a single polaroid filter can be used that is configured to filter both horizontal polarization and vertical polarization. For example, the single polaroid filter can include a horizontal polaroid portion on a first portion of the single polaroid filter and a vertical polaroid portion on a second portion of the single polaroid filter. For another example, the single polaroid filter may include a mechanical or electrical component that allows the single polaroid filter to change from filtering horizontal polarization to filtering vertical polarization. While this description might describe directions using horizontal and vertical, it should be recognized that the directions are relative to the light emitter 1320, and each direction is separated by approximately 90 degrees.

In some examples, a light detector can produce an intensity signal, indicating an amount of light received by the light detector. Accordingly, when a filter is used to prevent a particular polarization from reaching the light detector, the light detector can detect either vertical polarization or horizontal polarization in a light beam (whether the light beam is directly from a light emitter or reflected from a surface). In some examples, the intensity signal can be amplified with either an amplifier built in or external to the light detector. In such examples, a sensitivity of the light detector may be greater than 150 mV/(uW/cm$^2$). In one illustrative example, each light detector can have a sampling rate of greater than or equal to 10 samples per second. However, it should be recognized that other sampling rates can be used.

The surface type detection system 1300 may further include a base 1310. The base 1310 can be rigid, ensuring a consistent spatial configuration of the light emitter 1320, the horizontal light detector system 1330, and the vertical light detector system 1340. In one illustrative example, the base 1310 can be a plastic structure. However, it should be recognized that the base 1310 can be made of other materials (e.g., metal or an organic material such as wood).

A direction to aim the light emitter 1320 can be based on Brewster's angle for surfaces that the surface type detection system 1300 is configured to distinguish between. In some examples, the direction can be near an average angle (e.g., within 1-2 degrees of the average angle). For example, if Brewster's angle for a first surface is 58 degrees from a normal of the first surface and Brewster's angle for a second surface is 62 degrees from a normal of the second surface, the light emitter 1320 can be aimed at 60 degrees from a normal of a surface. However, it should be recognized that the direction to aim the light emitter 1320 can be determined in other ways that are based on Brewster's angle for a surface (e.g., the direction can be equal to a determined Brewster's angle for a particular surface such that the surface type detection system 1300 can identify the particular surface). In one illustrative example, the direction to aim the light emitter 1320 can be within 1 degree of 60 degrees from a normal of a surface.

A percentage difference can be computed for intensity signals identified by the horizontal light detector system 1330 and the vertical light detector system 1340. The percentage difference can be determined in either hardware or software and either on or remote from the robotic cleaning device (e.g., on a remote device). Mathematically, the calculation can be:

$$\text{Percentage difference} = \frac{\text{Intensity}_{Vertical} - \text{Intensity}_{Horizontal}}{\text{Intensity}_{Horizontal}} \quad \text{Equation 1}$$

or $$\text{Percentage difference} = \frac{\text{Intensity}_{Vertical} - \text{Intensity}_{Horizontal}}{\text{Intensity}_{Vertical}} \quad \text{Equation 2}$$

A threshold value can be determined for distinguishing between surface types (depending on which formula above is used). For example, if the percentage difference is greater than the threshold value, it can be determined that the surface is a first surface type. In other examples, a range of percentage differences can be associated with a particular surface type such that when the percentage difference falls within the range, the surface is determined to be a corresponding surface type.

In equation 1 above, a carpet can have a percentage difference near zero and a hard surface can have a percentage difference that is larger than zero, typically much greater than one. In equation 2 above, a carpet can have a percentage difference near one and a hard surface can have a percentage difference greater than 1 but smaller than values given by equation 1.

In some examples, rather than using a percentage different for a particular location, the surface type detection system 1300 can determine a type of a surface based on a variance between locations. For example, if successive locations for a surface return a similar percentage difference, the surface can be determined to be a first type of surface (e.g., hardwood), and if successive locations for the surface return different percentage differences, the surface can be determined to be a second type of surface (e.g., carpet).

Figure 14:
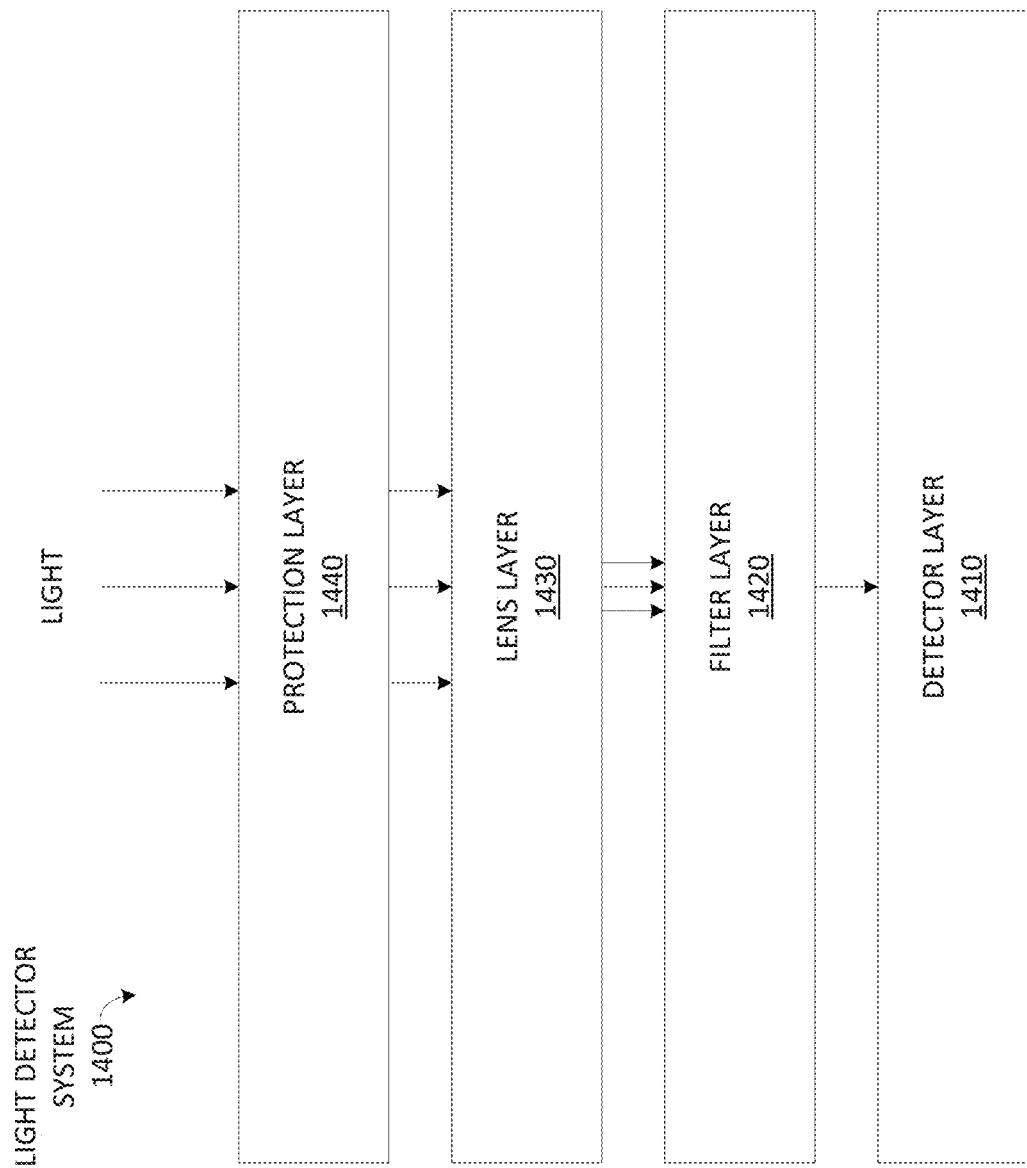
FIG. 14 illustrates an example of layers of a light detector.

FIG. 14 illustrates an example of layers of a light detector system 1400. The layers can include a detector layer 1410, a filter layer 1420, a lens layer 1430, a protection layer 1440, or any combination thereof. For example, the light detector 1400 might include the detector layer 1410, the filter layer 1420, and the protection layer 1440 but not the lens layer 1430. It should be recognized that other configurations, including order of layers in the light detector system 1400, can be used. When there are multiple layers in the light detector system 1400, each layer on top of the detector layer 1410 can allow at least a portion of light to pass through it such that light can be received by the detector layer 1410.

The detector layer 1410 can include one or more light detectors. A light detector can detect an amount of light received by the light detector. In some examples, the light detected by the light detector can be visible, infrared, or ultraviolet light. The one or more light detectors may be recessed to reduce ambient light interference. For example, the one or more light detectors may be located inside of a housing of a robotic cleaning robot. For another example, the one or more light detectors may include at least a portion of material extending from one or more sides of the one or more light detectors to block ambient light.

The filter layer 1420 can include a filter for each of the one or more light detectors in the detector layer 1410. Each filter can be coupled to at least a portion of a light detector such that light received by the light detector is first filtered by the filter. In some example, a filter can be a polaroid filter, preventing a particular polarization (e.g., horizontal or vertical) from reaching the light detector. By preventing the particular polarization from reaching the light detector, a filter can allow the light detector to detect an amount of a different polarization. In some examples, a filter can be coupled to a light detector. In other examples, a filter can lay against a light detector, held in place by another component.

The lens layer 1430 can include a lens that focuses incoming light to be filtered by the filter layer 1420 and/or detected by the detector layer 1410. Lens layer 1430 and filter layer 1420 may be in reverse order where light passes through filter layer 1420 before passing through lens layer 1430.

The protection layer 1440 can protect one or more other layers of the light detector system 1400. For example, the protection layer 1440 can be a cover (to protect the one or more layers from being damaged by physical debris) and/or a dust window to prevent dust from accumulating. In the configuration where lens layer 1430 layer and filter layer 1420 are in reverse order (i.e., where the light passes through filter layer 1420 before passing through lens layer 1430), filter layer 1420 may provide the functionality of the protection layer.

D. Environment Mapping and Planning Based on Surface Type Detection

As described above, a plan for a robotic cleaning robot to clean an environment can be determined based on types of surfaces in the environment. In some examples, the plan can be determined by the robotic cleaning device at the time that a type of surface is detected. In other examples, the plan can be determined by the robotic cleaning device at a time after a type of surface is detected (e.g., when the robotic cleaning device returns to a charging station). The plan can also be asynchronously determined by a remote server (or a remote device). For example, the robotic cleaning device can send data detected by the robotic cleaning device to the remote server for the remote server to determine the plan. Examples of the data sent to the remote server can include intensity of light detected by a light detector of the robotic cleaning device, a percentage difference for a surface, a type of a surface, or the like. The data can be sent to the remote server when the data is available or at some time after the data is available (e.g., when the robotic cleaning device returns to a charging station or connects to a network).

The plan can include a route for the robotic cleaning device to take in the environment and/or one or more configurations to apply to the robotic cleaning device during the route. The one or more configurations, as discussed more below, can include different cleaning elements (e.g., a type of vacuum, a pad, water, soap, a type of brush, distance above a surface to have a cleaning element, speed to move the robotic cleaning device, speed to turn the robotic cleaning device, a number of times to traverse a location, direction to traverse a location from, or the like).

In some examples, the plan can be associated with multiple robotic cleaning devices. In such examples, the multiple robotic cleaning devices can be controlled as such to optimize a cleaning process. For example, multiple robotic cleaning devices can be executing routes simultaneously. For another example, a first robotic cleaning device can include one or more components specialized for a first type of surface and a second robotic cleaning device can include one or more components specialized for a second type of surface. The first robotic cleaning device can be made to clean the first type of surface at the same time or at a different time as the second robotic cleaning device can be made to clean the second type of surface.

Determining the plan can include generating an environmental map for the environment. In some examples, the environmental map can include one or more layers, each layer including one or more types of data. For example, a first layer can include obstacles located in the environment and a second layer can include surface types of the environment. In some examples, the environmental map can be generated based on a machine learning algorithm that learns from surface types detected by the robotic cleaning device. In other examples, the environmental map can be generated once a user confirms surface types that were detected by the robotic cleaning device.

In other examples, the environmental map can be generated after a confidence level (sometimes referred to as a confidence threshold) has been reached that a determined surface type is correct. The confidence level can be based on a difference between a detected percentage difference and a known percentage difference. The confidence level can be based on a number of times a particular type of surface has been detected for a location. The confidence level can be based on a difference between percentage differences detected for the same location. It should be recognized that the confidence level can be based on other factors that can be identified or determined by the robotic cleaning device.

Figure 15:
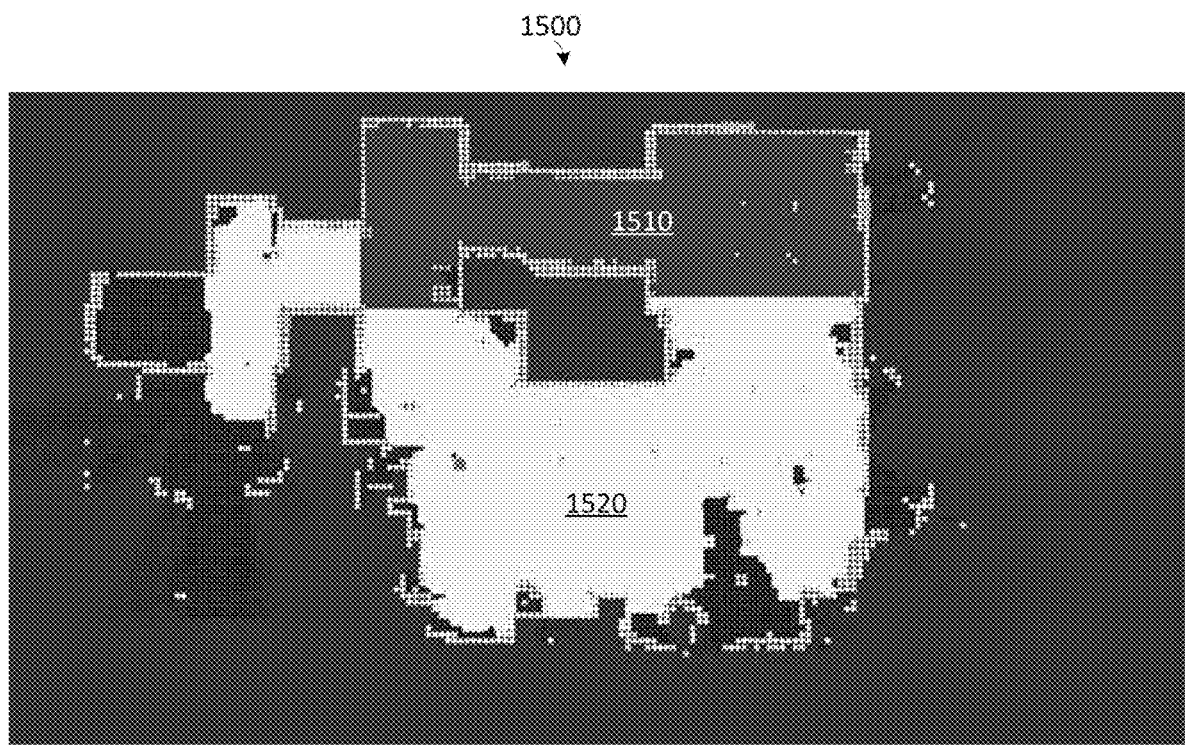
FIG. 15 depicts an example of an environmental map.

FIG. 15 depicts an example of an environmental map 1500. The environmental map 1500 can correspond to an environment that can be at least partially navigated by a robotic cleaning robot. The environmental map 1500 can include boundaries of the environment. The boundaries can be determined by any method known in the art. For example, the boundaries can be provided to the environmental map 1500 by an administrator, a LIDAR system that detects the boundaries, bump sensors can detect the boundaries, or the like.

The environmental map 1500 can further include surface types of portions of the environment (e.g., a first surface type 1510 and a second surface type 1520). In some examples, each portion of the environment can be associated with a probability that indicates a likelihood that the portion is a type of a surface.

In some examples, the surface types can be received by the robotic cleaning device as data determined by a remote system. For example, an administrator can determine surface types for an environment and send the surface types to the robotic cleaning device.

In other examples, the robotic cleaning device (or a remote server receiving data from the robotic cleaning device) can determine surface types for the environmental map 1500. For example, the robotic cleaning device can detect types of surfaces that are inserted into the environmental map 1500. The detected types can be based on one or more previous routes of the robotic cleaning robot.

Figure 16A:
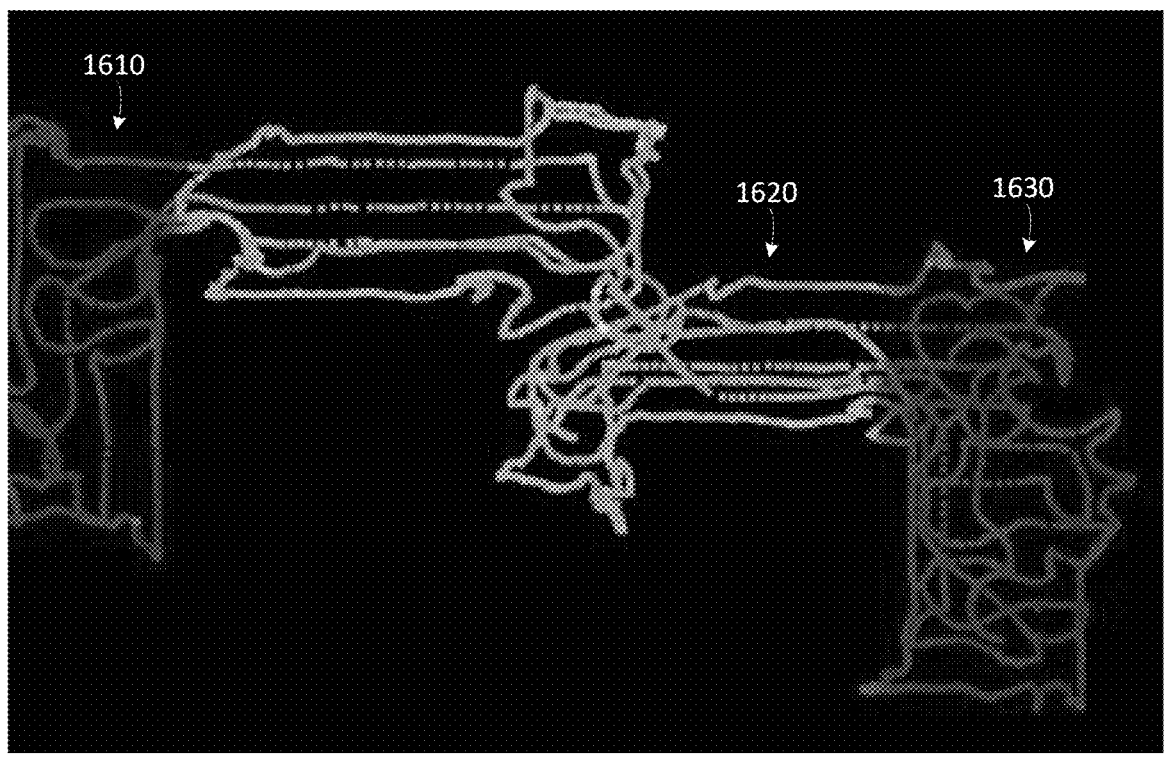
FIG. 16A illustrates an example of surface type data determined by a robotic cleaning device for an environment.

FIG. 16A illustrates an example of surface type data determined for a surface of an environment. The environment depicted in FIG. 16A is different than the environment depicted in FIG. 15. The surface type data illustrated in FIG. 16A includes three areas (e.g., a first area 1610, a second area 1620, and a third area 1630). The first area 1610 and the third area 1630 can be determined to be a first type of surface, indicated by the same color. The second area 1620 can be determined to be a second type of surface, indicated by a different color than the first area 1610 and the third area 1630.

Figure 16B:
FIG. 16B depicts an example of an environmental map based on surface type data determined by a robotic cleaning device for an environment.

However, as can be seen in FIG. 16A, the surface type data may be incomplete. To make up for incomplete areas, the surface type data can be supplemented by boundaries of the environment and a machine learning technique (such as nearest neighbor algorithm). The machine learning technique may determine surface types of areas based on incomplete information. For example, the nearest neighbor algorithm can expand detected surface types to boundaries to generate an environmental map, as illustrated in FIG. 16B, which depicts an example of an environmental map 1600 based on surface type data determined by data detected by a robotic cleaning device for the environment. The environmental map 1600 can include a first area 1612 (which can correspond to the first area 1610), a second area 1622 (which can correspond to the second area 1620), and a third area 1632 (which can correspond to the third area 1630). For another example, the machine learning technique may identify likely geometries of surface types (e.g., dimensions of a rug). Based on the likely geometries, the machine learning technique may identify floor types.

In some embodiments, surface type data for an area may be changed over time. For example, a particular area may be first determined to be a first type of surface. Based on contradicting data, the particular area may be changed to a second type of surface.

Detection of types of surfaces can be performed by any method, including by using reflection data, diffusion data, ultrasonic sensors that pick up a phase change of a released wave, different loading on a motor in contact with a surface, or the like. In some examples, different types of data, and/or data determined at different times, can be weighted based on a confidence or a relative reliability of the data. For example, if a particular technique is traditionally more accurate than another, the particular technique can be weighted more. For another example, a surface type detected closer to the current time can be weighted more than a surface type detected farther from the current time.

In some examples, a route for a plan can be changed to "audit" data detected by the robotic cleaning device. For example, the route can be changed to arrive at particular areas of an environment at different times of the day to determine whether ambient light is affecting the data detected by the robotic cleaning device. For another example, the route can be changed so that the robotic cleaning device can detect data at a location from a different direction. In such an example, the robotic cleaning device can detect the data at the location when the robotic cleaning device is facing a first direction and a second direction to see if the direction affects the data.

FIG. 17 is a simplified flowchart depicting processing performed for determining and executing a plan for a robotic cleaning device to clean an environment. The processing depicted in FIG. 17 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 17 and described below is intended to be illustrative and non-limiting. The particular series of processing steps depicted in FIG. 17 is not intended to be limiting.

Processing steps with a dotted line indicate that the processing steps are optional. In particular, 1710 and 1720 provide one example of how a type of a surface can be determined. However, it should be recognized that the type of the surface can be determined using other processes.

At 1710, an intensity of a first portion of a light beam can be detected by one or more components included with the robotic cleaning device after the first portion is filtered by a first polaroid filter. The light beam can be transmitted by a light emitter (e.g., a light-emitting diode (LED)). The light beam can be reflected from a surface before the first portion of the light beam is filtered by the first polaroid filter. The reflection can cause the first portion to be at least partially polarized. Different types of surfaces can cause the first portion to be polarized at different amounts. In some examples, the light beam can be transmitted at an angle that corresponds to Brewster's angle of a known type of surface. For example, the angle can be an average of multiple polarizations angles, each Brewster's angle for a different known type of surface. For another example, the angle can be Brewster's angle of a known type of surface.

At 1720, an intensity of a second portion of the light beam can be detected by one or more components included with the robotic cleaning device after the second portion is filtered by a second polaroid filter. The light beam can be reflected from a surface before the second portion of the light beam is filtered by the second polaroid filter. The reflection can cause the second portion to be at least partially polarized. Different types of surface can cause the first portion to be polarized at different amounts.

In some examples, the first polaroid filter can have a first polarization axis and the second polaroid filter can have a second polarization axis. In such examples, the first polarization axis can be perpendicular to the second polarization axis.

At 1730, a type of a surface of the environment can be determined based on data received from a first trip of the robotic cleaning device. The type of the surface may be determined by a processor included with the robotic cleaning device, one or more arithmetic logic units (e.g., a hardware added, difference, and/or divider, such as an OP amp summer or divider) included with the robotic cleaning device, or on a device remote from the robotic cleaning device.

In some examples, the data received from the first trip can include the intensity of the first portion and the intensity of the second portion. In such examples, the type of the surface can be determined by computing a percentage difference for the intensity of the first portion and the intensity of the second portion. The percentage difference can be compared to a predefined reflection polarization percentage difference of a known type of surface. When the predefined reflection polarization percentage difference is within a threshold (e.g., a specified threshold) of the percentage difference, the known type of surface can be determined to correspond to the type of the surface. The percentage difference can be computed and/or compared on the robotic cleaning device or a remote server.

In other examples, the percentage difference can be compared to multiple predefined reflection polarization percentage differences, each predefined reflection polarization percentage difference for a known type of surface. In such examples, the type of the surface of the environment can be determined to correspond to a known type of surface when the known type of surface is within a reasonable amount. A person of ordinary skill will be able to readily define the reasonable amount based on the multiple predefined reflection polarization percentage differences.

The type of the surface can be added to an environmental map (as described above) that is stored by the robotic cleaning robot. In some embodiments, the environmental map may be sent to a remote device (e.g., a user device) in the form of an image. The image may present the different surface types, which may allow a user to indicate one or more rules for the environmental map and/or types of surfaces (e.g., the user may choose particular spots to designate as go/nogo areas, or particular types of surfaces to designate as go/nogo, or to change speeds of the robotic cleaning device when going over particular surface types, etc). The one or more rules may then be sent to a device to determine a plan.

At 1740, a plan for the robotic cleaning device to clean the environment can be identified. Identifying the plan can include accessing a memory location that includes the plan. The plan can be stored in the memory location by the robotic cleaning device after either the robotic cleaning device determines the plan or after a remote server determines the plan. The plan can be determined based on the environmental map (e.g., based on the type of the surface). In some embodiments, a user using a remote device (e.g., the remote server) may select an environmental map to use for the plan. In other embodiments, an environmental map may be selected based on a previous environmental map used or an output of one or more components for identifying a current location of the robotic cleaning device. The user may also indicate one or more rules associated with particular types of surfaces. For example, the user may indicate not to clean particular areas based on the environmental map or particular types of floor.

In some examples, the plan can include a route for the robotic cleaning device to take through the environment. Instead of or in addition to the route, the plan can include one or more configurations to apply to the robotic cleaning device. When there is a route, the one or more configurations can be applied to the robotic cleaning device for the route.

The one or more configurations can include changing the power for a component (e.g., a vacuum, a wheel, a motor, a mop, a sensor, or the like) of the robotic cleaning device. In some examples, a component of the robotic cleaning device can be turned off based on the plan. Other configurations that can be modified include speed of a component, which component (e.g., such as a brush, dirt bin, or sidebrush switcher) is used (if the robot has a tool switching device), a height of travel clearance for the robotic cleaning device (if components are used that can raise and lower the robotic cleaning device), or an overall center-of-gravity of the robotic cleaning device (e.g., a carpet may be cleaned better if a nose of the robotic cleaning device is closer to the carpet, which can be done by sliding a mass up and down the robotic cleaning device). By changing the one or more configurations by the plan, the robotic cleaning robot can avoid particular surface types, increase or decrease the strength of a vacuum at particular times (e.g., upon reaching particular surface types), increase or decrease the speed of a brush at particular times, changing traversal speed of the robotic cleaning robot on particular surface types, or the like.

At 1750, the robotic cleaning device can execute at least a portion of the plan for a second trip of the robotic cleaning device. The robotic cleaning device can execute the plan until the plan changes based on a change in a circumstance of the robotic cleaning device. For example, a battery level can change for the robotic cleaning device that causes the plan to change, an obstacle can be encountered by the robotic cleaning device, a type of surface can be detected that causes the plan to change, or the like.

In some examples, the robotic cleaning device can continue to monitor types of surfaces in the environment during the second trip. If a type of surface detected during the second trip is different than a type of surface determined for the surface, a confidence level can be computed for each of the type of surface detected during the second trip and the type of surface determined for the surface previously (e.g., a throw rug is detected on what was previously all wood flooring). The type of surface corresponding to the higher confidence level can be determined to be the correct type of surface for the surface. The confidence level can be based on a number of factors, as described above. The confidence level can further be based on a time since the type of surface has been determined. For example, the type of surface detected during the second trip can have a higher confidence than the type of surface determined for the surface previously if all other factors are equal. In other examples, the most recent type of surface determined can be determined to be the type of the surface.

Techniques described above can improve cleaning quality of a robotic cleaning device. For example, when the robotic cleaning device is in a mode suitable for cleaning a wooden surface, the robotic cleaning device can navigate an environment to maximize time on wooden surfaces (e.g., the robotic cleaning device can clean surfaces that are wooden before other surfaces).

For another example, a driving wheel of the robotic cleaning device might sink into carpet. And if the driving wheel sinks into the carpet, the distance between the carpet and a suction component of the robotic cleaning device can become shorter, creating a greater sucking force. To solve the issue, the robotic cleaning device can change the power for the suction component to moderate the sucking force.

E. Computer Systems for Media Platform and Client System

Figure 18:
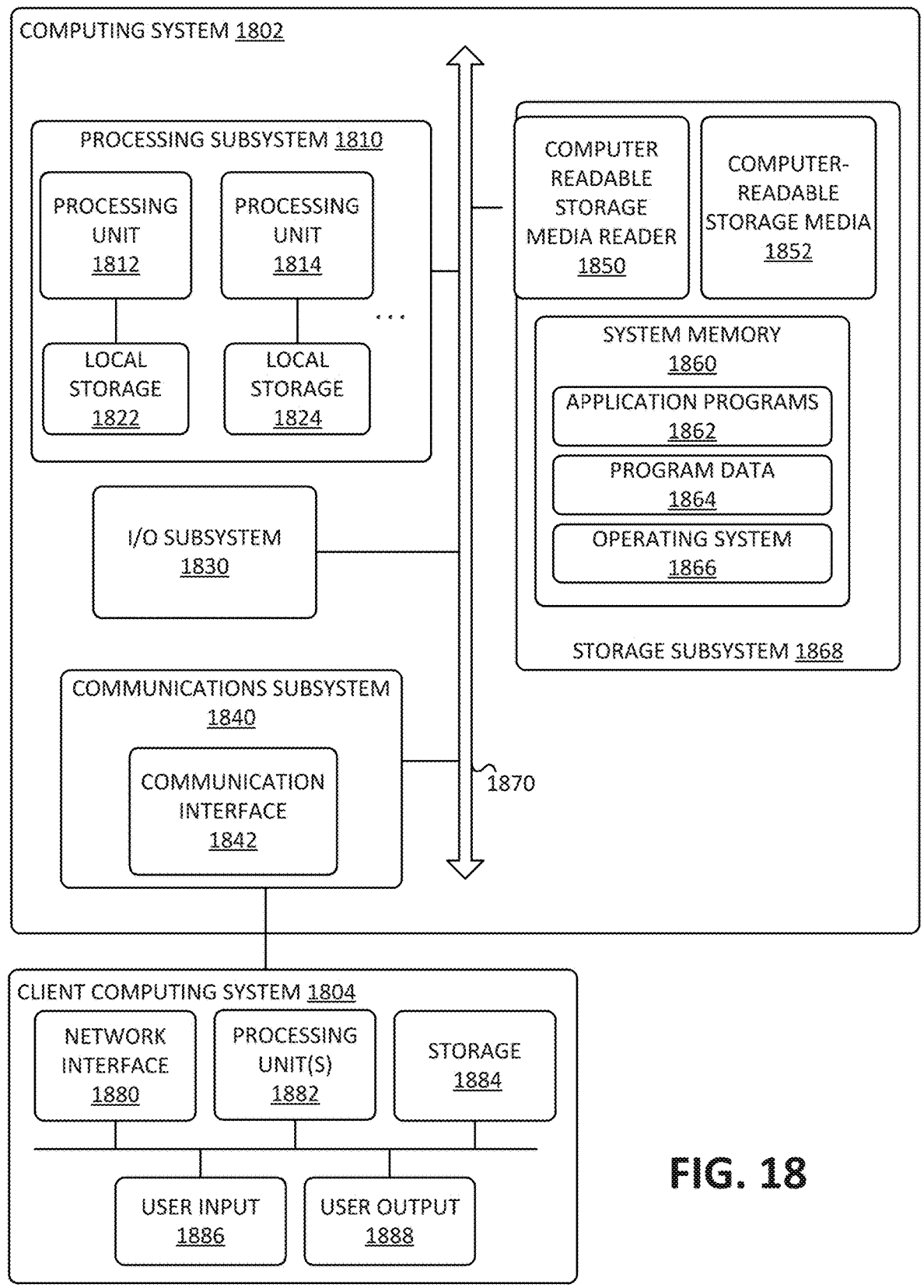
FIG. 18 is a simplified block diagram of a representative computing system and client computing system.

Various operations described herein may be implemented on computer systems. FIG. 18 shows a simplified block diagram of a representative computing system 1802 and client computing system 1804 usable to implement certain embodiments of the present disclosure. In various embodiments, computing system 1802 or similar systems may implement the cleaning robot processor system, remote server, or any other computing system described herein or portions thereof. Client computing system 1804 or similar systems may implement user devices such as a smartphone or watch with a robot cleaner application.

Computing system 1802 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 1802 may include processing subsystem 1810. Processing subsystem 1810 may communicate with a number of peripheral systems via bus subsystem 1870. These peripheral systems may include I/O subsystem 1830, storage subsystem 1868, and communications subsystem 1840.

Bus subsystem 1870 provides a mechanism for letting the various components and subsystems of server computing system 1804 communicate with each other as intended. Although bus subsystem 1870 is shown schematically as a single bus, alternative embodiments of the bus subsystem may utilize multiple buses. Bus subsystem 1870 may form a local area network that supports communication in processing subsystem 1810 and other components of server computing system 1802. Bus subsystem 1870 may be implemented using various technologies including server racks, hubs, routers, etc. Bus subsystem 1870 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 1830 may include devices and mechanisms for inputting information to computing system 1802 and/or for outputting information from or via computing system 1802. In general, use of the term "input device" is intended to include all possible types of devices and mechanisms for inputting information to computing system 1802. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 1802 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 1810 controls the operation of computing system 1802 and may comprise one or more processing units 1812, 1814, etc. A processing unit may include one or more processors, including single core processor or multicore processors, one or more cores of processors, or combinations thereof. In some embodiments, processing subsystem 1810 may include one or more special purpose co-processors such as graphics processors, digital signal processors (DSPs), or the like. In some embodiments, some or all of the processing units of processing subsystem 1810 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 1822, 1824. Any type of processors in any combination may be included in processing unit(s) 1812, 1814.

In some embodiments, processing subsystem 1810 may be implemented in a modular design that incorporates any number of modules (e.g., blades in a blade server implementation). Each module may include processing unit(s) and local storage. For example, processing subsystem 1810 may include processing unit 1812 and corresponding local storage 1822, and processing unit 1814 and corresponding local storage 1824.

Local storage 1822, 1824 may include volatile storage media (e.g., conventional DRAM, SRAM, SDRAM, or the like) and/or non-volatile storage media (e.g., magnetic or optical disk, flash memory, or the like). Storage media incorporated in local storage 1822, 1824 may be fixed, removable or upgradeable as desired. Local storage 1822, 1824 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 1812, 1814 need at runtime. The ROM may store static data and instructions that are needed by processing unit(s) 1812, 1814. The permanent storage device may be a non-volatile read-and-write memory device that may store instructions and data even when a module including one or more processing units 1812, 1814 and local storage 1822, 1824 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 1822, 1824 may store one or more software programs to be executed by processing unit(s) 1812, 1814, such as an operating system and/or programs implementing various server functions such as functions of described above. "Software" refers generally to sequences of instructions that, when executed by processing unit(s) 1812, 1814 cause computing system 1802 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 1812, 1814. In some embodiments the instructions may be stored by storage subsystem 1868 (e.g., computer readable storage media). In various embodiments, the processing units may execute a variety of programs or code instructions and may maintain multiple concurrently executing programs or processes. At any given time, some or all of the program code to be executed may be resident in local storage 1822, 1824 and/or in storage subsystem including potentially on one or more storage devices. Software may be implemented as a single program or a collection of separate programs or program modules that interact as desired. From local storage 1822, 1824 (or non-local storage described below), processing unit(s) 1812, 1814 may retrieve program instructions to execute and data to process in order to execute various operations described above.

Storage subsystem 1868 provides a repository or data store for storing information that is used by computing system 1802. Storage subsystem 1868 provides a tangible non-transitory computer-readable storage medium for storing the basic programming and data constructs that provide the functionality of some embodiments. Software (programs, code modules, instructions) that when executed by processing subsystem 1810 provide the functionality described above may be stored in storage subsystem 1868. The software may be executed by one or more processing units of processing subsystem 1810. Storage subsystem 1868 may also provide a repository for storing data used in accordance with the present disclosure.

Storage subsystem 1868 may include one or more non-transitory memory devices, including volatile and non-volatile memory devices. As shown in FIG. 18, storage subsystem 1868 includes a system memory 1860 and a computer-readable storage media 1852. System memory 1860 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 1802, such as during start-up, may typically be stored in the ROM. The RAM typically contains data and/or program modules that are presently being operated and executed by processing subsystem 1810. In some implementations, system memory 1860 may include multiple different types of memory, such as static random access memory (SRAM) or dynamic random access memory (DRAM). Storage subsystem 1868 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 1868.

By way of example, and not limitation, as depicted in FIG. 18, system memory 1860 may store application programs 1862, which may include client applications, Web browsers, mid-tier applications, relational database management systems (RDBMS), etc., program data 1864, and one or more operating systems 1866. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1852 may store programming and data constructs that provide the functionality of some embodiments. Software (programs, code modules, instructions) that when executed by processing subsystem 1810 a processor provide the functionality described above may be stored in storage subsystem 1868. By way of example, computer-readable storage media 1852 may include non-volatile memory such as a hard disk drive, a magnetic disk drive, an optical disk drive such as a CD ROM, DVD, a Blu-Ray® disk, or other optical media. Computer-readable storage media 1852 may include, but is not limited to, Zip® drives, flash memory cards, universal serial bus (USB) flash drives, secure digital (SD) cards, DVD disks, digital video tape, and the like. Computer-readable storage media 1852 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1852 may provide storage of computer-readable instructions, data structures, program modules, and other data for computing system 1802.

In certain embodiments, storage subsystem 1868 may also include a computer-readable storage media reader 1850 that may further be connected to computer-readable storage media 1852. Together and, optionally, in combination with system memory 1860, computer-readable storage media 1852 may comprehensively represent remote, local, fixed, and/or removable storage devices plus storage media for storing computer-readable information.

In certain embodiments, computing system 1802 may provide support for executing one or more virtual machines. Computing system 1802 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 1802. Accordingly, multiple operating systems may potentially be run concurrently by computing system 1802. Each virtual machine generally runs independently of the other virtual machines.

Communication subsystem 1840 provides an interface to other computer systems and networks. Communication subsystem 1840 serves as an interface for receiving data from and transmitting data to other systems from computing system 1802. For example, communication subsystem 1840 may enable computing system 1802 to establish a communication channel to one or more client computing devices via the Internet for receiving and sending information from and to the client computing devices.

Communication subsystem 1840 may support both wired and/or wireless communication protocols. For example, in certain embodiments, communication sub system 1840 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 1840 may provide wired network connectivity (e.g., Ethernet) in addition to or instead of a wireless interface.

Communication subsystem 1840 may receive and transmit data in various forms. For example, in some embodiments, communication subsystem 1840 may receive input communication in the form of structured and/or unstructured data feeds, event streams, event updates, and the like. For example, communication subsystem 1840 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 1840 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 1840 may also be configured to output the structured and/or unstructured data feeds, event streams, event updates, and the like to one or more databases that may be in communication with one or more streaming data source computers coupled to computing system 1802.

Communication subsystem 1840 may provide a communication interface 1842, e.g., a WAN interface, which may provide data communication capability between the local area network (bus subsystem 1870) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 1802 may operate in response to requests received via communication interface 1842. Further, in some embodiments, communication interface 1842 may connect computing systems 1802 to each other, providing scalable systems capable of managing high volumes of activity. Conventional or other techniques for managing server systems and server farms (collections of server systems that cooperate) may be used, including dynamic resource allocation and reallocation.

Computing system 1802 may interact with various user-owned or user-operated devices via a wide-area network such as the Internet. An example of a user-operated device is shown in FIG. 18 as client computing system 1802. Client computing system 1804 may be implemented, for example, as a consumer device such as a smart phone, other mobile phone, tablet computer, wearable computing device (e.g., smart watch, eyeglasses), desktop computer, laptop computer, and so on.

For example, client computing system 1804 may communicate with computing system 1802 via communication interface 1842. Client computing system 1804 may include conventional computer components such as processing unit(s) 1882, storage device 1884, network interface 1880, user input device 1886, and user output device 1888. Client computing system 1804 may be a computing device implemented in a variety of form factors, such as a desktop computer, laptop computer, tablet computer, smart phone, other mobile computing device, wearable computing device, or the like.

Processing unit(s) 1882 and storage device 1884 may be similar to processing unit(s) 1812, 1814 and local storage 1822, 1824 described above. Suitable devices may be selected based on the demands to be placed on client computing system 1804; for example, client computing system 1804 may be implemented as a "thin" client with limited processing capability or as a high-powered computing device. Client computing system 1804 may be provisioned with program code executable by processing unit(s) 1882 to enable various interactions with computing system 1802 of a message management service such as accessing messages, performing actions on messages, and other interactions described above. Some client computing systems 1804 may also interact with a messaging service independently of the message management service.

Network interface 1880 may provide a connection to a wide area network (e.g., the Internet) to which communication interface 1840 of computing system 1802 is also connected. In various embodiments, network interface 1880 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 1886 may include any device (or devices) via which a user may provide signals to client computing system 1804; client computing system 1804 may interpret the signals as indicative of particular user requests or information. In various embodiments, user input device 1886 may include any or all of a keyboard, touch pad, touch screen, mouse or other pointing device, scroll wheel, click wheel, dial, button, switch, keypad, microphone, and so on.

User output device 1888 may include any device via which client computing system 1804 may provide information to a user. For example, user output device 1888 may include a display to display images generated by or delivered to client computing system 1804. The display may incorporate various image generation technologies, e.g., a liquid crystal display (LCD), light-emitting diode (LED) including organic ligh-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 1888 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1812, 1814 and 1882 may provide various functionality for computing system 1802 and client computing system 1804, including any of the functionality described herein as being performed by a server or client, or other functionality associated with message management services.

It will be appreciated that computing system 1802 and client computing system 1804 are illustrative and that variations and modifications are possible. Computer systems used in connection with embodiments of the present disclosure may have other capabilities not specifically described here. Further, while computing system 1802 and client computing system 1804 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While specific embodiments have been described, one skilled in the art will recognize that numerous modifications are possible. Embodiments may be realized using a variety of computer systems and communication technologies including but not limited to specific examples described herein.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although specific embodiments have been described, it will be appreciated that the invention is intended to cover all modifications and equivalents within the scope of the following claims.

What is claimed is:

1. A robotic cleaning device comprising:
 a housing;
 a drive motor mounted in the housing;
 a drive system, coupled to the drive motor, for moving the robotic cleaning device;/
 a light emitter configured to transmit a light beam at a surface;
 a first polaroid filter;
 at least a first light detector configured to detect an intensity of a first reflected portion of the light beam after the first reflected portion is filtered by the first polaroid filter;
 a second polaroid filter;
 the at least a first light detector being configured to detect an intensity of a second reflected portion of the light beam after the second reflected portion is filtered by the second polaroid filter; and
 either:
 a processor; and
 a non-transitory computer-readable medium including instructions that, when executed by the processor, cause the processor to:
 send the intensity of the first reflected portion of the light beam and the intensity of the second reflected portion to a device remote from the robotic cleaning device, wherein the device is configured to determine a type of the surface based on the intensity of the first reflected portion and the intensity of the second reflected portion; or
 determine a type of the surface based on the intensity of the first reflected portion and the intensity of the second reflected portion; or
 one or more arithmetic logic units to determine a type of the surface based on the intensity of the first reflected portion and the intensity of the second reflected portion.

2. The robotic cleaning device of claim 1, wherein the at least a first light detector comprises a first light detector positioned to receive light from the first polaroid filter and a second light detector positioned to receive light from the second polaroid filter; and
 wherein the instructions, when executed by the processor, further cause the processor to:
 cause the light emitter to transmit the light beam; and
 obtain each of:
 the intensity of the first reflected portion of the light beam and
 the intensity of the second reflected portion of the light beam.

3. The robotic cleaning device of claim 1, wherein the instructions, when executed by the processor, further cause the processor to:
 determine a plan for the robotic cleaning device to clean an environment, wherein the plan is determined based on the type of the surface; and
 execute at least a portion of the plan for a trip of the robotic cleaning device.

4. The robotic cleaning device of claim 3, wherein determining the plan is further based on data detected during a second trip or information received from a remote device.

5. The robotic cleaning device of claim 4, wherein the information received from the remote device includes one or more rules associated with particular types of surfaces.

6. The robotic cleaning device of claim 3, wherein the plan includes a route for the robotic cleaning device to take through the environment or one or more configurations to apply to the robotic cleaning device when executing the plan.

7. The robotic cleaning device of claim 3, wherein the type of the surface is determined based on a first trip of the robotic cleaning device, and wherein the plan is executed on a second trip of the robotic cleaning device.

8. The robotic cleaning device of claim 1, wherein the instructions, when executed by the processor, further cause the processor to send the type of the surface to a remote server, wherein the remote server is configured to:
 determine a plan for the robotic cleaning device to clean an environment, wherein the plan is determined based on the type of the surface; and
 send the plan to the robotic cleaning device.

9. The robotic cleaning device of claim 8, wherein the instructions, when executed by the processor, further cause the processor to:
 receive the plan; and
 execute at least a portion of the plan for a trip of the robotic cleaning device.

10. The robotic cleaning device of claim 1, wherein the first polaroid filter has a first polarization axis, wherein the second polaroid filter has a second polarization axis, and wherein the first polarization axis is perpendicular to the second polarization axis.

11. The robotic cleaning device of claim 10, wherein the first polarization axis is parallel to a plane of incidence of the light beam, and wherein the second polarization axis is perpendicular to the plane of incidence of the light beam.

12. The robotic cleaning device of claim 1, wherein determining the type of the surface includes:
 computing a percentage difference for the intensity of the first reflected portion and the intensity of the second reflected portion;
 comparing the percentage difference to a predefined reflection polarization percentage difference of a known type of surface; and
 determining that the percentage difference is within a threshold of the predefined reflection polarization percentage difference.

13. A method for executing a plan for a robotic cleaning device to clean an environment, the method comprising:
 determining a type of a surface of the environment;
 identifying the plan for the robotic cleaning device to clean the environment, wherein the plan is determined based on the type of the surface;
 executing, by the robotic cleaning device, at least a portion of the plan for a first trip of the robotic cleaning device;
 detecting an intensity of a first portion of a light beam after the first portion is filtered by a first polaroid filter; and
 detecting an intensity of a second portion of the light beam after the second portion is filtered by a second polaroid filter, wherein the data received from the first trip includes the intensity of the first portion and the intensity of the second portion.

14. The method of claim 13, wherein determining the type of the surface includes:
 computing a percentage difference for the intensity of the first portion and the intensity of the second portion;
 comparing the percentage difference to predefined reflection polarization percentage difference of a known types of surface; and determining that the percentage difference is within a threshold of the predefined reflection polarization percentage difference.

15. The method of claim 13, wherein the first polaroid filter has a first polarization axis, wherein the second polaroid filter has a second polarization axis, and wherein the first polarization axis is perpendicular to the second polarization axis.

16. A computer-program product tangibly embodied in a non-transitory machine-readable storage medium, including instructions that, when executed by one or more processors, cause the one or more processors to:

- detect an intensity of a first portion of a light beam after the first portion is filtered by a first polaroid filter;
- detect an intensity of a second portion of the light beam after the second portion is filtered by a second polaroid filter, wherein the data received from the a first trip includes the intensity of the first portion and the intensity of the second portion;
- compute a percentage difference for the intensity of the first portion and the intensity of the second portion;
- compare the percentage difference to a predefined reflection polarization percentage difference of a known types of surface;
- determine a type of a surface of an environment based on determining that the percentage difference is within the a threshold;
- identify a plan for a robotic cleaning device to clean the environment, wherein the plan is determined based on the type of the surface; and
- execute, by the robotic cleaning device, at least a portion of the plan.

* * * * *